United States Patent [19]

Hunt et al.

[11] Patent Number: 5,714,836
[45] Date of Patent: Feb. 3, 1998

[54] FLUORESCENT LAMP WITH IMPROVED PHOSPHOR BLEND

[75] Inventors: Roger B. Hunt, Medfield; Lawrence L. Hope, Maynard; William J. Roche, Merrimac, all of Mass.

[73] Assignee: GTE Products Corporation, Danvers, Mass.

[21] Appl. No.: 937,332

[22] Filed: Aug. 28, 1992

[51] Int. Cl.$^6$ .................................. H01J 1/62
[52] U.S. Cl. .............................. 313/487; 313/486
[58] Field of Search ..................... 313/487, 486, 313/577, 639, 467, 468, 485, 493; 427/67, 69; 362/101, 84, 806

[56] References Cited

U.S. PATENT DOCUMENTS

| | | | |
|---|---|---|---|
| 3,858,082 | 12/1974 | Thornton, Jr. | 313/487 |
| 3,875,453 | 4/1975 | Thornton, Jr. | 313/487 |
| 3,937,998 | 2/1976 | Verstegen et al. | 313/487 |
| 3,963,953 | 6/1976 | Thornton, Jr. | 313/487 |
| 3,992,646 | 11/1976 | Corth | 313/487 |
| 4,055,781 | 10/1977 | Schreurs et al. | 313/487 |
| 4,231,892 | 11/1980 | Chang et al. | 252/301.6 |
| 4,251,750 | 2/1981 | Galien et al. | 313/487 |
| 4,266,161 | 5/1981 | Kasenga | 313/487 |
| 4,296,353 | 10/1981 | Walter | 313/487 |
| 4,305,019 | 12/1981 | Gragg et al. | 313/487 |
| 4,423,349 | 12/1983 | Nakajima et al. | 313/487 |
| 4,551,397 | 11/1985 | Yaguchi et al. | 428/691 |
| 4,602,188 | 7/1986 | de Hair et al. | 313/487 |
| 4,623,816 | 11/1986 | Hoffman et al. | 313/487 |
| 4,717,857 | 1/1988 | Wozniak et al. | 313/487 |
| 4,728,459 | 3/1988 | Fan | 252/301.5 |
| 4,797,594 | 1/1989 | Sigai et al. | 313/488 |
| 4,806,824 | 2/1989 | Paynter et al. | 313/486 |
| 5,051,277 | 9/1991 | Sigai et al. | 427/69 |
| 5,087,523 | 2/1992 | Klinedinst et al. | 427/69 |
| 5,132,590 | 7/1992 | Kimoto et al. | 313/487 |

*Primary Examiner*—Chanh Nguyen
*Attorney, Agent, or Firm*—Robert E. Walter; Robert F. Clark

[57] ABSTRACT

A fluorescent lamp comprises at least one layer of a quad-phosphor blend for emitting visible illumination having a white color. The quad-phosphor blend comprising a first and second green emitting phosphor component with each green emitting phosphor component having different visible emission spectrum principally in the 520 to 560 nm wavelength range. A third blue emitting phosphor component has an emission spectrum principally in the 440 to 470 nm wavelength range. A fourth red emitting phosphor component has an emission spectrum principally in the 590 to 620 nm wavelength range. The first green emitting phosphor component is a alkaline earth metal activated phosphor and the second green emitting phosphor is a rare earth activated phosphor wherein the relative proportions of the phosphor components are such that an enhanced color rendering index is produced as compared to tri-component blends formed from three of the phosphor components.

27 Claims, 6 Drawing Sheets

FLUORESCENT LAMP WITH IMPROVED PHOSPHOR BLEND

TECHNICAL FIELD OF THE INVENTION

This invention relates to fluorescent lamps and fluorescent lamp phosphors.

BACKGROUND OF THE INVENTION

Desirable fluorescent lamp characteristics are high brightness and high color rendering at an economical cost. To achieve this goal, such lamps as the Octron and Designer series of lamps are constructed with two layers of phosphor coatings. The first or the base coat is an inexpensive halophosphate phosphor of the desired lamp color temperature. The second or skin coat is comprised of three expensive rare earth activated phosphors, emitting in the red, green and blue spectral regions, blended to effect a composite white emission of desired color temperature. In this configuration the expensive tri-phosphor blend absorbs the ultra-violet excitation energy of the Hg plasma in excess proportion to the weight of the phosphor in the lamps. The halophosphate base coat absorbs the excitation energy that eludes the skin coat, while diluting the high CRI and brightness capability of the tri-phosphor blend. Even though these phosphor blends achieve desirable economic and performance characteristics, further improvements are desirable.

U.S. Pat. No. 4,623,816 to Hoffman et al relates to a fluorescent lamp utilizing a dual phosphor layer coating having a conventional calcium haloapatite phosphor and a top phosphor layer comprising a tri-phosphor blend including a lanthanum cerium orthophosphate phosphor activated with terbium ion as the green color component along with an europium-activated yttrium oxide phosphor as the red color component.

U.S. Pat. No. 4,797,594 to Sigai et al relates to a fluorescent reprographic lamp having a phosphor layer disposed on and coextensive with a reflector layer and a protective coating over at least the portion of the inner surface of the lamp envelope not covered with the reflector layer. The phosphor layer comprises particles of green-emitting zinc orthosilicate phosphor which are individually coated with a non-particulate, conformal aluminum oxide coating.

A skin coat or tri-phosphor blend that has been used is a red $Y_2O_3:Eu^{+3}$ (Sylvania Type 2342), a green $CeMgAl_{11}O_{19}:Tb^{+3}$ (Sylvania Type 2297), and a blue $BaMg_2Al_{16}O_{27}:Eu^{+2}$. Fluorescent lamps utilizing the above skin coat have achieved high color rendering and high brightness while demonstrating excellent durability in the harsh environment of the fluorescent lamp. However, additional and further improvements are desirable. Especially desirable is the production of a blend which produces efficient white emission and improved color rendition at an even more economical cost.

U.S. Pat. No. 4,296,353 to Walter relates to a fluorescent lamp having a coating on the inner surface of the glass envelope comprising a blend of four narrow band emitting phosphors. The spectral power distribution curves for the phosphor blends consist of four narrow bands centered at about 450–480 nm, 510–540 nm, 570–590 nm, and 600–630 nm. The particular phosphors utilized were divalent europium activated barium magnesium aluminate, manganese activated zinc orthosilicate, trivalent dysposium activated yttrium vanadate, and europium activated yttrium oxysulfide. Phosphor blends include a Cool White lamp, Warm White lamp, and Daylight lamp.

The luminous efficacy, color rendering index and other lamp output characteristics may be varied depending upon the particular composition of the lamp phosphors utilized. Certain terms as used in this specification have meanings which are generally accepted in the lighting industry. These terms are described in the IES LIGHTING HANDBOOK, Reference Volume, 1984, Illuminating Engineering Society of North America. The color rendering index of light source (CRI) is a measure of the degree of color shift objects undergo when illuminated by the light source as compared with the color of those same objects when illuminated by a reference source of comparable color temperature. The CRI rating consists of a General Index, $R_a$, based on a set of eight test-color samples that have been found adequate to cover the color gamut. The color appearance of a lamp is described by its chromaticity coordinates which can be calculated from the spectral power distribution according to standard methods. See CIE, Method of measuring and specifying color rendering properties of light sources (2nd ed.), Publ. CIE No. 13.2 (TC-3.2), Bureau Central de la CIE, Paris, 1974. The CIE standard chromaticity diagram includes the color points of black body radiators at various temperatures. The locus of black body chromaticities on the x,y-diagram is known as the Planckian locus. Any emitting source represented by a point on this locus may be specified by a color temperature. A point near but not on this Planckian locus has a correlated color temperature (CCT) because lines can be drawn from such points to intersect the Planckian locus at this color temperature such that all points look to the average human eye as having nearly the same color. Luminous efficacy of a source of light is the quotient of the total luminous flux emitted by the total lamp power input as expressed in lumens per watt (LPW or lm/W).

The present invention addresses the problem of how to economically elevate color rendering while retaining high light flux.

BRIEF SUMMARY OF THE INVENTION

In accordance with the present invention, there is provided a fluorescent lamp comprising a glass envelope having electrodes at its ends, a mercury and inert gas filling within the envelope which produces ultraviolet radiation and a coating on the interior surface of the glass envelope comprising at least one layer of a quad-phosphor blend for a converting a substantial portion of said ultraviolet radiation to visible illumination having a white color. The quad-phosphor blend comprising a first and second green emitting phosphor component with each green emitting phosphor component having different visible emission spectrum principally in the 520 to 560 nm wavelength range. A third blue emitting phosphor component has an emission spectrum principally in the 440 to 470 nm wavelength range. A fourth red emitting phosphor component has an emission spectrum principally in the 590 to 620 nm wavelength range. The first green emitting phosphor component is a alkaline earth metal activated phosphor and the second green emitting phosphor is a rare earth activated phosphor. The relative proportions of the phosphor components are such that an enhanced color rendering index is produced as compared to tri-component blends formed from a three phosphor component blend of a single green component.

DETAILED DESCRIPTION

Figure 1:
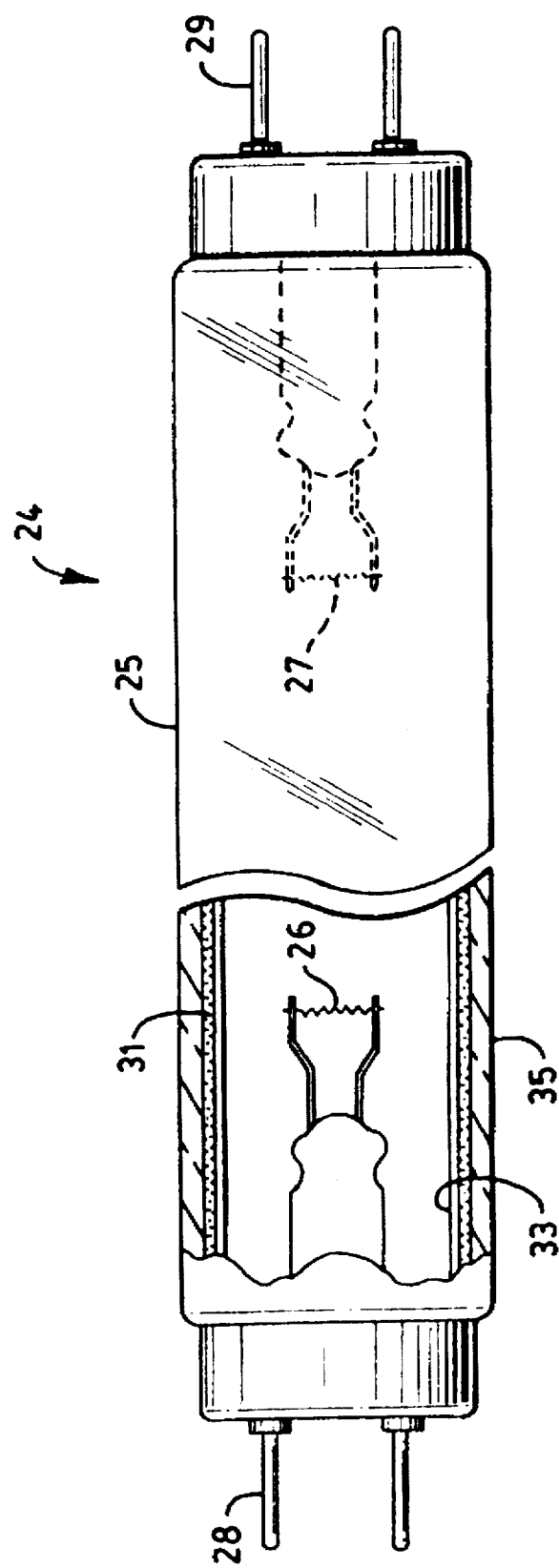
FIG. 1 is perspective view partially broken away of a low pressure mercury discharge fluorescent lamp construction utilizing a dual layer phosphor coating.

Referring to FIG. 1, there is shown a fluorescent lamp 24 containing a phosphor excitable to fluorescence. The lamp 24 comprises a tubular, hermetically sealed, glass envelope 25. Electrodes 26 and 27 are sealed in the ends of envelope 25. Suitable terminals 28 and 29 are connected to the electrodes 26 and 27 and project from envelope 25. The electrodes 26 and 27 extend through glass presses in mount stems to the terminals 28 and 29.

The interior of the tube is filled with an inert gas such as argon, neon or a mixture of inert gases such as argon and krypton at a low pressure, for example 2 torr, and a small quantity of mercury, at least enough to provide a low vapor pressure during operation. An arc generating and sustaining medium such as one or more inert gases and mercury is included within envelope 25 so that ultraviolet radiation is produced in the interior of the glass envelope during lamp operation. A phosphor coating 31 on the interior surface of the glass envelope converts the emitted ultraviolet radiation to visible illumination having a white color.

In accordance with the principles of the present invention, an improved phosphor layer of the present invention which is illustrated at 33 comprises a quad blend of four phosphors of which two are green emitting phosphors. Although dual phosphor layers are shown in FIG. 1, the quad blend of the present invention may be utilized as a single coat.

In FIG. 1, the dual layer comprises a first layer 35 deposited on the inner glass surface and a second phosphor layer or top layer 33 deposited on the first phosphor layer 35. The use of a dual phosphor layer permits the weight of phosphor utilized in the second or top coat to be reduced and a less expensive phosphor to be utilized as the first layer 35. The first layer 35 preferably comprises a finely divided fluorescent calcium haloapatite phosphor exhibiting the desired white color point. The second layer or top layer 33 comprises a quad phosphor blend on the inside of the tube so that a substantial portion of the ultraviolet radiation is instantly converted to visible illumination having a white color. The relative proportions of the components in the blend are such that an enhanced color rendering index is produced as compared to a tri-component blends formed from a three phosphor component blend consisting of a single green component.

The first layer or inner coating typically comprises a halogenated alkaline earth phosphate with the activator element being lead, manganese, antimony or tin. The host has the apatite structure, a typical example being calcium chlorophosphate $3Ca_3(PO_4)2.CaCl_2$. Many modifications are possible including partial substitutions of the alkaline earth cations by other divalent metals such as zinc and cadmium. Also, partial substitutions of the chloride by fluoride ions is desirable for some applications.

Phosphor materials which result from these combinations generally exhibit good luminescence when stimulated by short (253.7 nanometers) ultraviolet radiation, the response being greatest when the materials are synthesized to produce small deviations from stoichiometry. In particular, activation by combinations of antimony and manganese will produce a wide spectrum of luminescent emissions from alkaline earth phosphates excited by ultraviolet light. Thus, these phosphors have wide application fluorescent lamps and may be adjusted in composition to provide white light which varies from "cool" to "warm" white. Typical phosphors are "Warm White", Sylvania™ Type 4300 and "Cool White", Sylvania™ Type 4450. Although the above calcium chlorophosphate phosphors are economical, improvements to color rendering and efficacy are desirable.

The quad-phosphor blend includes a first and second green emitting phosphor component, each having different visible emission spectrum principally in the 520 to 560 nm wavelength range, a third blue emitting phosphor component having an emission spectrum principally in the 440 to 470 nm wavelength range, and a fourth red emitting phosphor component having an emission spectrum principally in the 590 to 620 nm wavelength range. The first green emitting phosphor is an alkaline earth metal activated phosphor while the second green emitting phosphor is a rare earth activated phosphor.

Figure 3:
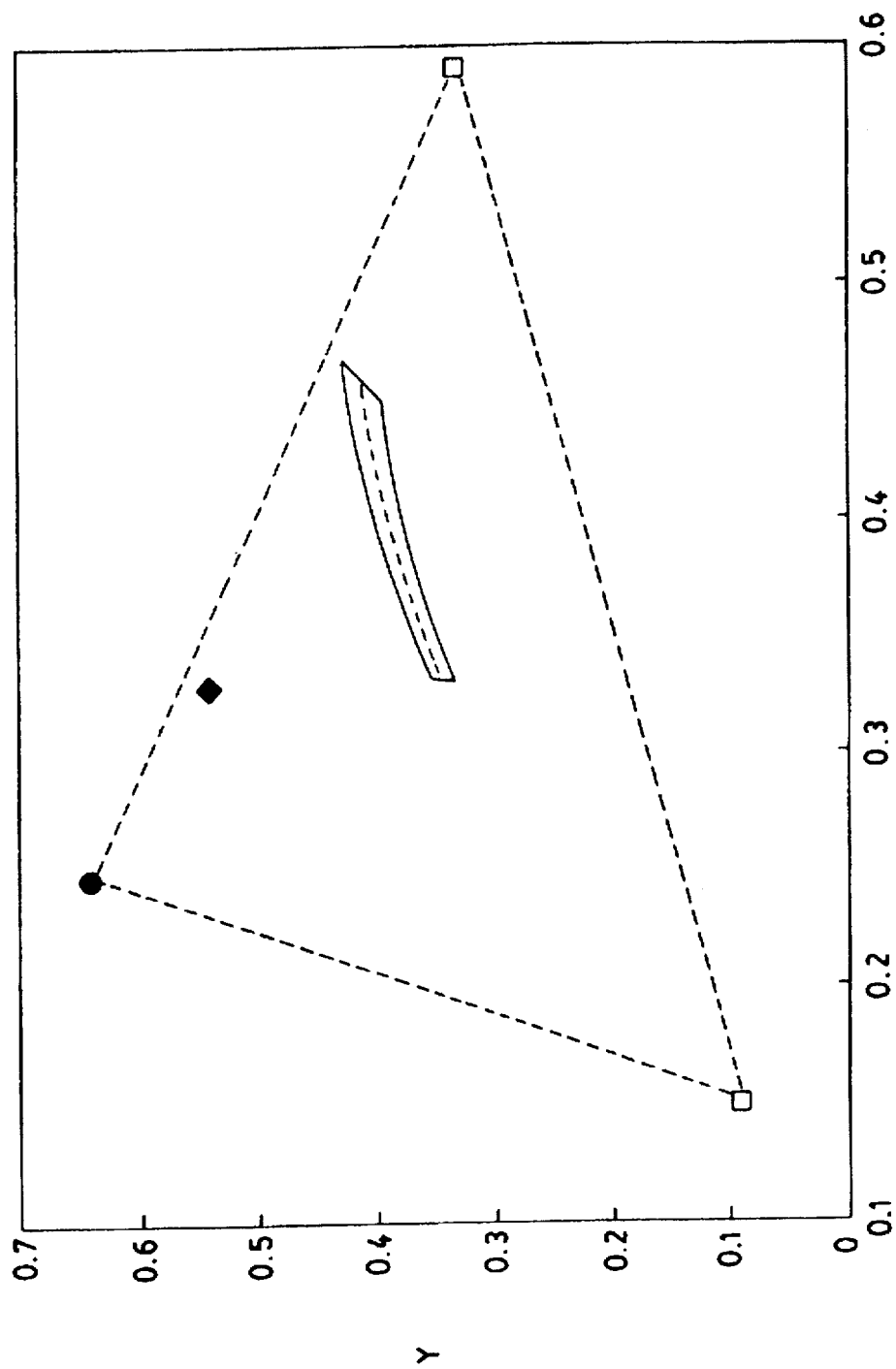
FIG. 3 graphically illustrates the range of lamp colors of the present invention on a CIE 1931 standard colorimetric observer x-y chromaticity diagram.

The relative proportions of the components of the quad-phosphor blend light generating medium are such that when their emissions are blended, there is produced visible light of predetermined x and y values of CIE coordinates wherein the x value is in the range of about 0.3 to about 0.45, and said y value is in the range of about 0.3 to about 0.45 and within the triangle of FIG. 3. Additionally, the relative proportions of the components are such that an enhanced color rendering index is produced as compared to a tri-component blend formed from a three phosphor component blend consisting of single green component and the above third and fourth components where the green is either one of the green emitting phosphor components. Preferably the combination of phosphors result in a predetermined color point where the x value is in the range of about 0.3 to about 0.45, and the y value is within about 0.25 of the Planckian locus. Preferably the phosphor blends have substantially uniform and predetermined brightness and CRI. Preferably the brightness is greater than 80 LPW, more preferably greater than 85 LPW and the CRI is greater than about 80 CRI, more preferably greater than about 85 CRI. The proportions of the phosphor components are adjusted to obtain the high brightness and CRI throughout the desirable color point range so that so that lamps have uniformly high brightness and color point.

As an overcoat and adjacent the first layer, a second layer comprising a quad blend of phosphors is applied as an overcoat. In accordance with the preferred embodiments of the present invention, the quad-phosphor blend comprises, as the first green emitting phosphor, particles of a green emitting manganese-activated zinc orthosilicate phosphor having a protective layer thereon. The second green phosphor component and the red and blue components are typically expensive rare earth activated narrow-band green, red and blue emitting phosphors which give the desirable qualities of high brightness and excellent color rendering to the lamp.

The amount of the quad-phosphor blend applied is generally between about 10 percent and 50 percent of the total combined phosphor weight of the two coats. Two-coat lamps which include the blend of the present invention as the second layer exhibit increased CRI values when compared with lamps made with only the narrow band rare earth activated green-emitting phosphor component in the second layer of phosphor.

The preferred alkaline earth metal activated green emitting phosphor is a zinc orthosilicate phosphor. As used herein, "green-emitting zinc orthosilicate phosphor" includes any phosphor having a zinc orthosilicate matrix which is activated by at least manganese (II) ions, and which emits light having a peak wavelength of approximately 520–540 nm under 253.7 nanometer excitation. For example, "green-emitting zinc orthosilicate phosphor" is intended to include zinc orthosilicate phosphors having a matrix which may be stoichiometric or non-stoichiometric with respect to zinc, silicon, or oxygen, as well as those which may have a lattice defect. "Green-emitting zinc orthosilicate phosphor" is further intended to include such phosphor in which the zinc cation has been partially replaced by other cations. See, for example, U.S. Pat. No. 4,231,892 to Chang et al. or U.S. Pat. No. 4,551,397 to Yaguchi et al. Also intended to be included within the scope of "green-emitting zinc orthosilicate phosphors" as used herein is such phosphor which has one or more activators in addition to manganese (II). U.S. Pat. No. 4,728,459 to Fan describes a manganese-activated zinc silicate phosphor containing a small amount of tungsten to improve maintenance which may be utilized in the present invention.

The preferred green-emitting zinc orthosilicate phosphor has a continuous aluminum oxide coating surrounding individual phosphor particles. Continuous refers to the non-particulate nature of the coating on each coated particle while conformal refers to the coating replication of the submicron surface features found naturally occurring on the uncoated phosphor particles. Such a coated phosphor is made by the techniques described in U.S. Pat. No. 4,825,124 to Sigai. As set forth therein, the continuous aluminum oxide coating is deposited by chemical vapor deposition in a fluidized bed, e.g., an aluminum containing precursor material is deposited on the outer surface of phosphor powder particles while the particles are suspended in an inert gas stream and the aluminum-containing precursor material is reacted to form aluminum oxide. Examples of suitable precursors of the aluminum-containing compounds include alkyl aluminum compounds, aluminum alkoxides, and aluminum acetylacetonates.

A coated zinc orthosilicate phosphor is described in copending application Ser. No. 06/902,265 (D 86-1-062), entitled PHOSPHOR PARTICLE, PHOSPHOR BLEND, AND FLUORESCENT LAMP. The zinc orthosilicate phosphor has a continuous aluminum oxide coating surrounding its outer surface and has the empirical formula $Zn_{(2.00-x-y)}Mn_xSiO_{(4.00-y)}(WO_3)_z$, wherein x is from 0.04 to 0.15, y is from 0 to 0.05, and z is from 0 to 0.002. As set forth therein, the phosphor is prepared in such a manner that entirely all of the Mn is in the plus two valence state. Such preparation as is disclosed in detail is incorporated into the present specification.

The most preferred zinc orthosilicate phosphor comprises a bi-layer CVD coating as taught by Sigai and Klinedinst in U.S. Pat. No. 5,051,277 entitled "Method of Forming a Protective Bi-Layer Coating on Phosphor Particles" and U.S. Pat. No. 5,087,523 entitled "Phosphors with Improved Lumen Output and Lamps Made Therefrom". As set forth in the above patents, the green-emitting zinc orthosilicate phosphor activated with manganese, also known by the mineral name willemite can be improved by the application of a bi-layer coating prior to annealing. The bi-layer consists of a thin coating of silica applied between the base phosphor and a conformal alumina coating which is exposed to the mercury discharge. The silica coating prevents reaction between the zinc silicate phosphor and the alumina coating as set forth in the above patents.

A method for forming a continuous layer of silica on phosphor particles is disclosed in the above patents. The method comprises vaporizing a silicon containing precursor such as tetramethyloxysilane or tetraethoxyorthosilane into an inert carrier gas and passing this gas through the phosphor powder. The phosphor particles are enveloped in the precursor at a temperature of greater than 400 degrees Centigrade. An oxidizing gas is passed into the phosphor powder which reacts with the precursor to form a continuous coating of silica on the phosphor particles. The resulting silica coated phosphor is preferably further coated with alumina.

The second green emitting phosphor preferably comprises a rare earth activated phosphor. Due to the rare earth activator, the second green emitting phosphor is less economical than the first green emitting phosphor. Typical green emitting rare earth activated phosphors comprise Tb—Ce activated magnesium aluminate, Tb—Ce activated yttrium silicate, and Tb—Ce activated lanthanum orthophosphate. The preferred second green phosphor is the Tb—Ce activated lanthanum orthophosphate having the formula $LaPO_4:Ce,Tb$. U.S. Pat. No. 4,423,349 to Nakajima et al describes such a phosphor having a peak emission at about 550 nm. The structural formula is set forth as $La_xTb_yCe_zPO_4$ where x+y+z=1; x is greater than 0.05 and less than 0.35, y is greater than 0.05 and less than 0.3, and z is greater than 0.6 and less than 0.9. This type of phosphor is commercially available from Nichia company as Type NP220 phosphor. A preferred Sylvania phosphor is Type 2211, $LaPO_4:Ce,Tb$, known as LAP.

The third phosphor component is a blue emitting phosphor which is typically a narrow band emitting phosphor. Typical blue emitting phosphors are europium activated barium magnesium aluminate, europium activated strontium cholorophosphate, and europium activated strontium barium calcium chlorophosphate. The preferred blue emitting phosphor is a barium magnesium aluminate activated by divalent europium and having a peak emission at 455 nm, such a phosphor is having the formula $BaMg_2Al_{16}O_{27}:Eu^{+2}$ is available as Sylvania Type 2461.

The fourth phosphor component is a red emitting phosphor. Typical red emitting phosphors are activated by trivalent europium. Preferred red emitting phosphors are europium activated gadolinium oxide ($Gd_2O_3:Eu^{+3}$) and europium activated yttrium oxide ($Y_2O_3:E^{+3}$). A most preferred red emitting phosphor is the yttrium oxide activated by trivalent europium having a peak emission at 611 nm and available as Sylvania™ Type 2342.

Figure 2:
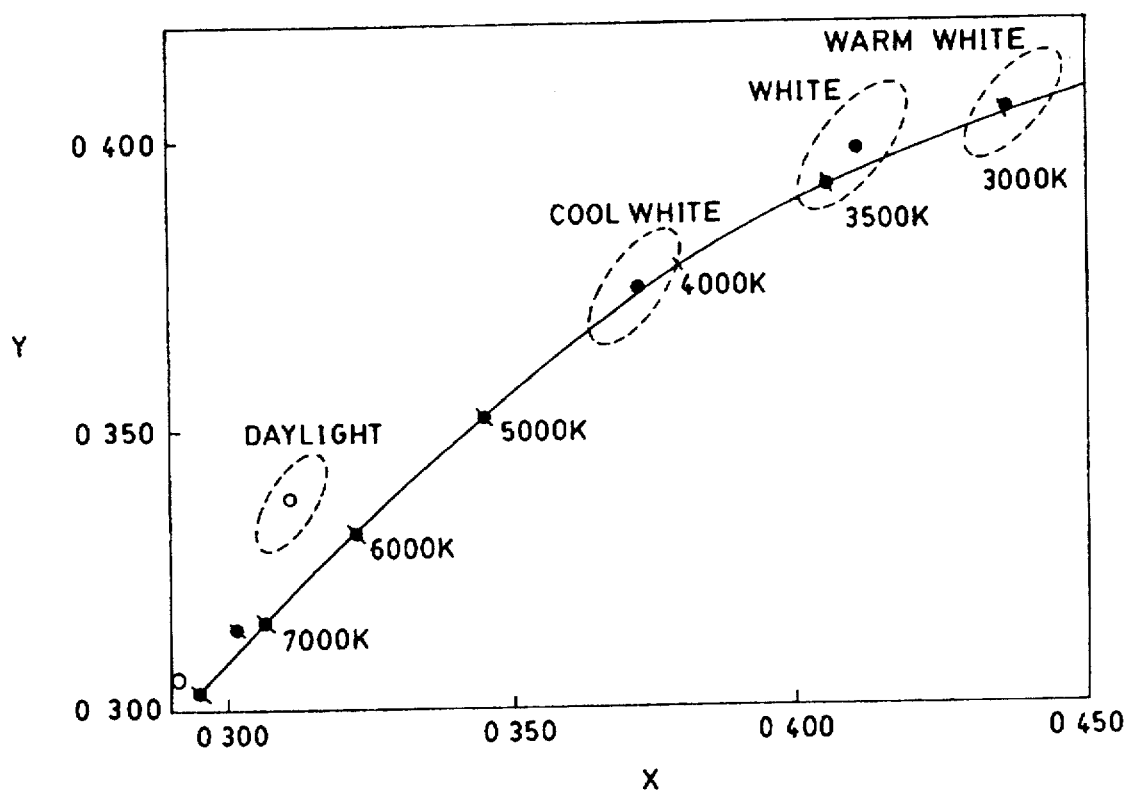
FIG. 2 is an x-y cromaticity diagram according to the 1931 standard showing spectroradiometrically determined assignments according to the ANSI Colorimetric Standard C78.3768-1966 for fluorescent lamps. See IES LIGHTING HANDBOOK, pg. 5-15, Fifth Edition, Illuminating Engineering Sociey, (1972).

FIG. 2 demonstrates illustrates an x-y cromaticity diagram showing the placement of the standard fluorescent colors of cool white, white, and warm white on a standard chromaticity diagram. FIG. 3 illustrated, in the CIE 1931 standard colorimetric observer x-y chromaticity diagram, the range of lamp colors that can be produced with blends of a quad blend of lamp phosphors. The large triangle encompasses all possible lamp colors, ranging on the right from a blend that is substantially the red component, at the top substantially one of the green components, and on the left where the blend is substantially the blue component. In the case illustrated in the FIG. 3, the first green phosphor component, the alkaline earth metal activated green phosphor, is the previously discussed bi-layered CVD coated zinc orthosilicate phosphor, more specifically Sylvania Type 2288. The second green component, the rare earth activated green phosphor, is a previously discussed Tb—Ce activated lanthanum orthophosphate, more specifically Sylvania Type 2211. The third phosphor component is previously discussed blue emitting phosphor, a barium magnesium aluminate activated by divalent europium, more specifically a Sylvania Type 2211. The fourth phosphor component is previously discussed red emitting phosphor, a trivalent europium activated yttrium oxide, more specifically a Sylvania Type 2261.

As illustrated in FIG. 3, the preferred range where the advantages of the present invention are most apparent is represented within the area of the skewed rectangle central to the triangle and is defined as the region of white light of correlated color temperature from 2700 Kelvin to 5500 Kelvin with color points that fall a distance less than or equal to 0.0054 from the Black Body locus (in the 1960 UCS u-v diagram). This is the range specified by the CIE Publication No. 13.2 (TC-3.2) 1974, "Method of Measuring and Specifying Colour Rendering Properties of Light Sources", outside of which the calculation of CRI is expected to become less accurate.

In the above case, within the preferred range of white emitting lamps within the skewed rectangle, the preferred blend of phosphors based on weight percent comprise about 1 to about 35 weight percent of the alkaline metal activated green emitting phosphor, about 1 to about 50 percent of the rare earth activated green emitting phosphor, about 1 to about 30 percent of the blue emitting phosphor, and about 30 to about 70 weight percent of the red emitting phosphor.

The phosphor layers are applied by techniques known in the art. The first layer of phosphor such as, for example a calcium halophosphate activated by antimony and manganese is coated as a layer directly adjacent the glass from a liquid suspension. A phosphor coating suspension is prepared by dispersing the phosphor particles in a water-based system employing polyethylene oxide and hydroxyethyl cellulose as the binders with water as the solvent. The phosphor suspension is applied by causing the suspension to flow down the inner surface of the bulb. Evaporation of the water results in an insoluble layer of phosphor particles adhering to the inside surface of the bulb wall. The first layer is then dried prior to overcoating with the quad phosphor blend. The desired second phosphor layer is similarly applied from a water based suspension containing the appropriate and desired blend of phosphors. The second water base suspension containing the quad blend is allowed to flow over the first layer until the liquid is drained from the tube.

The following Examples are given to enable those skilled in this art to more clearly understand and practice the present invention.

The phosphor numbers given in the Examples below have identifying numbers utilized by GTE Products Corporation, Towanda, Pa., and are known as "Sylvania™" phosphors.

EXAMPLE 1

Table 1 below shows the performances of single coat tri-phosphor blends (not the present invention). The lamps represent the standard color temperatures of 3000 K., 3500 K., and 4100 K.

TABLE 1

TRI-PHOSPHOR BLENDS

Single coat lamps using CAT Green

| Blend Fractions | | | Color | 100 hr | |
|---|---|---|---|---|---|
| YOE | CAT | BAM | Temperature | Lumens | CRI |
| .630 | .322 | .048 | 3000° K. | 3499 | 85 |
| .564 | .359 | .077 | 3500° K. | 3497 | 84 |
| .480 | .399 | .121 | 4100° K. | 3463 | 82 |

Single coat lamps using LAP Green

| YOE | LAP | BAM | Color Temperature | 100 hr Lumens | CRI |
|---|---|---|---|---|---|
| .545 | .412 | .043 | 3000° K. | 3553 | 86 |
| .477 | .454 | .069 | 3500° K. | 3555 | 85 |
| .394 | .499 | .107 | 4100° K. | 3524 | 82 |

Single coat lamps using Willemite Green

| YOE | Willemite | BAM | Color Temperature | 100 hr Lumens | CRI |
|---|---|---|---|---|---|
| .668 | .293 | .039 | 3000° K. | 3361 | 80 |
| .617 | .324 | .059 | 3500° K. | 3350 | 83 |
| .552 | .360 | .088 | 4100° K. | 3308 | 85 |

The green rare earth phosphor, Sylvania Type 2211, LaPO$_4$:Ce,Tb containing blends show distinct advantages of brightness and CRI over the other green containing blends, although the Willemite green blends have the lowest cost. The problem with all of the blends, however is that the CRI is not consistent over the color temperature range desired of a product line. A four component blend utilizing a combined Type 2211, LaPO$_4$:Ce,Tb (LAP)/Willemite green component alleviates this problem and can provide a higher CRI than any other green containing blend. This is illustrated in Table 2 where a consistent 87 CRI is maintained through the color temperature range and the lamp brightness is equivalent to the CAT green blend, save the 4100° K. blend which is an insignificant one-half percent lower brightness.

TABLE 2

QUAD-PHOSPHOR BLEND
Lamps using LAP/Willemite Green F40/T12

| Blend Fractions | | | | Color | 100 hr | |
|---|---|---|---|---|---|---|
| YEO | LAP | Willemite | BAM | Temperature | Lumens | CRI |
| .561 | .292 | .103 | .044 | 3000° K. | 3499 | 87 |
| .497 | .318 | .116 | .069 | 3500° K. | 3497 | 87 |
| .428 | .298 | .169 | .105 | 4100° K. | 3441 | 87 |

The example of Table 2 shows that the four component blend allows (1) improvement in CRI over all the tri-phosphor blends of Table 1, and (2) consistency at all the popular color temperatures which is unattainable with the tri-phosphor blends, and better than 86 lumens/watt. This brightness and CRI performance is singular. As expected for the aforementioned blends, the amount of YEO red emitting phosphor decreases and the amount of BAM blue emitting phosphor increases as the blend moves along the Planckian locus from about 2700 K. to about 4500 K. Note that the ratio of LAP to willemite decreases from a weight ratio of about 3 to about 1.5 as the as the blend moves along the Planckian locus from about 2700 K. to about 4500 K. for maintaining a relatively uniform CRI and brightness for blends near the Panckian locus.

The phosphor particles were applied to the inner surface of a fluorescent lamp envelope and processed into a finished 4 Foot-T12(40 Watt) fluorescent lamp according to known techniques including the steps of slurrying the phosphor in an water base system employing polyethylene oxide and hydroxyethyl cellulose as the binders with water as the solvent. A typical composition of an aqueous suspension of quad-phosphor blend for coating a lamp comprises about 30 kg of phosphor in about 37 liters of water with 2.95 kg of Aluminum Oxide C, 0.3 kg of poly(ethylene oxide) (POLYOX made by Union Carbide), 3.1 cc defoamer (Hercules type 831) and 1.3 cc surfactant (BASF 25R-1). During the fabrication of lamps, the phosphor particles are typically dispersed in an aqueous medium.

EXAMPLE 2

To reduce the cost of lamp phosphors utilized in a fluorescent lamp, high cost rare earth activated phosphors are utilized in a two-coat configuration where an inexpensive halophosphate base coat, adjacent to the glass is topped with a second coat of a phosphor blend containing rare earth phosphors. The phosphor blend absorbs the bulk of the exciting radiation of the low-pressure Mercury discharge and also utilizes back reflected radiation from the halophosphate layer. In this configuration, 25 percent by weight of the phosphor blend can absorb 80 percent of the available ultraviolet radiation produced in the lamp.

In the above case, the four component blend of the present invention provides cost and/or performance advantages unavailable with tri-phosphor blends. In Table 3, are shown the performance of various bends in the Sylvania™ Designer 800 series lamps. The first lamp (1) is a Sylvania™ lamp product utilizing a CAT green containing blend. Lamps (2) and (3) are 2nd coat blends containing the other green components of interest.

TABLE 3

QUAD PHOSPHOR BLENDS, LAMP CHARACTERISTICS
F40/T12 Designer 830 Lamps 3000°K x = .440 y = .405
Rated: 3300 Lumens    CRI = 80

| | Blend Fractions | | | | 2nd Coat Weight | 100 hr LUMENS | CRI |
|---|---|---|---|---|---|---|---|
| YOE | CAT | LAP | WILL | BAM | | | |
| (1) .566 | 0 | .397 | 0 | .037 | 1.54 g | 3442 | 77 |
| (1) .566 | 0 | .397 | 0 | .037 | 1.73 g | 3467 | 78 |
| (1) .566 | 0 | .397 | 0 | .037 | 1.82 g | 3505 | 79 |
| (1) .566 | 0 | .397 | 0 | .037 | 2.12 g | 3412 | 80 |
| (2) .647 | .297 | 0 | 0 | .057 | 1.57 g | 3406 | 79 |
| (2) .647 | .297 | 0 | 0 | .057 | 1.74 g | 3407 | 81 |
| (2) .647 | .297 | 0 | 0 | .057 | 2.00 g | 3437 | 82 |
| (2) .647 | .297 | 0 | 0 | .057 | 2.18 g | 3473 | 83 |
| (3) .600 | 0 | .213 | .130 | .056 | 1.26 g | 3298 | 81 |
| (3) .600 | 0 | .213 | .130 | .056 | 1.58 g | 3329 | 83 |
| (3) .600 | 0 | .213 | .130 | .056 | 1.88 g | 3401 | 86 |
| (4) .611 | 0 | .206 | .132 | .051 | 1.34 g | 3335 | 81 |
| (4) .611 | 0 | .206 | .132 | .051 | 1.50 g | 3382 | 83 |
| (4) .611 | 0 | .206 | .132 | .051 | 1.84 g | 3404 | 85 |

One test of the quad-blend concept was carried out at the Versailles, Ky lamp plant. Shown in Table 3 are the photometry results of 2nd coat weight series in F40/T12 Sylvania Designer 830 lamps. Glass tubes with the base halophosphate coating only were taken from the production line. The average weight of the halo phosphor, Type 4300 Warm White was 3.8 grams. These base-coat-only tubes were subsequently hand coated with four different test blends at various second coat weights to evaluate the effect of 2nd coat weight on brightness and CRI. These hand second coated tubes were then placed back on the production equipment and finished into lamps.

The blend compositions CRI and 100 hr brightness and 2nd coat weights for the four different test blends are shown in Table 3. These Designer 830 lamps are rated for 3300 lumens at 100 hr at a CRI=80. Set (2) represents lamps made with a second coat tri-blend utilizing the CAT green. Sylvania type 2297. This blend represents typical production, and exceeds the specification CRI of 80 at 1.74 grams. As well the 100 hr brightness specification is exceeded. However, when the 2nd coat weight is decreased, for cost effectiveness and to be closer to the specification brightness, the CRI also decreases. Set (1) represents lamps made with a second coat tri-blend utilizing the LAP green, Sylvania type 2211. Note that the red fraction of the blend is diminished. This is of economic interest in that the red component is the most costly of the triphosphors. Note additionally that the lamp exhibits superior brightness but a CRI liability.

Sets (3) and (4) represent lamps made with quad-blends. The difference between blends (3) and (4) is the grade of 2288 phosphor green component, where the batch of 2288 green in set (4) was superior to that used in set (3). These quad-blends were designed to produce rated brightness and CRI at substantially reduced 2nd coat weight. Additionally the same quad-blend compositions achieve the 3400 lumen brightness at normal 2nd coat weights, as the current production tri-blends of set (2), but with a significant 5 point advantage in CRI. Note that the improved CRI is not approached by either rare-earth green triblends of sets (1) and (2).

The four component blend, where the green component is a blend of alumina coated willemite and Type 2211, $LaPO_4:Ce,Tb$ (LAP) green , provides a broad range of brightness and CRI and cost alternatives that are not available to tri-phosphor blends utilizing only one green.

EXAMPLE 3

Figure 4:
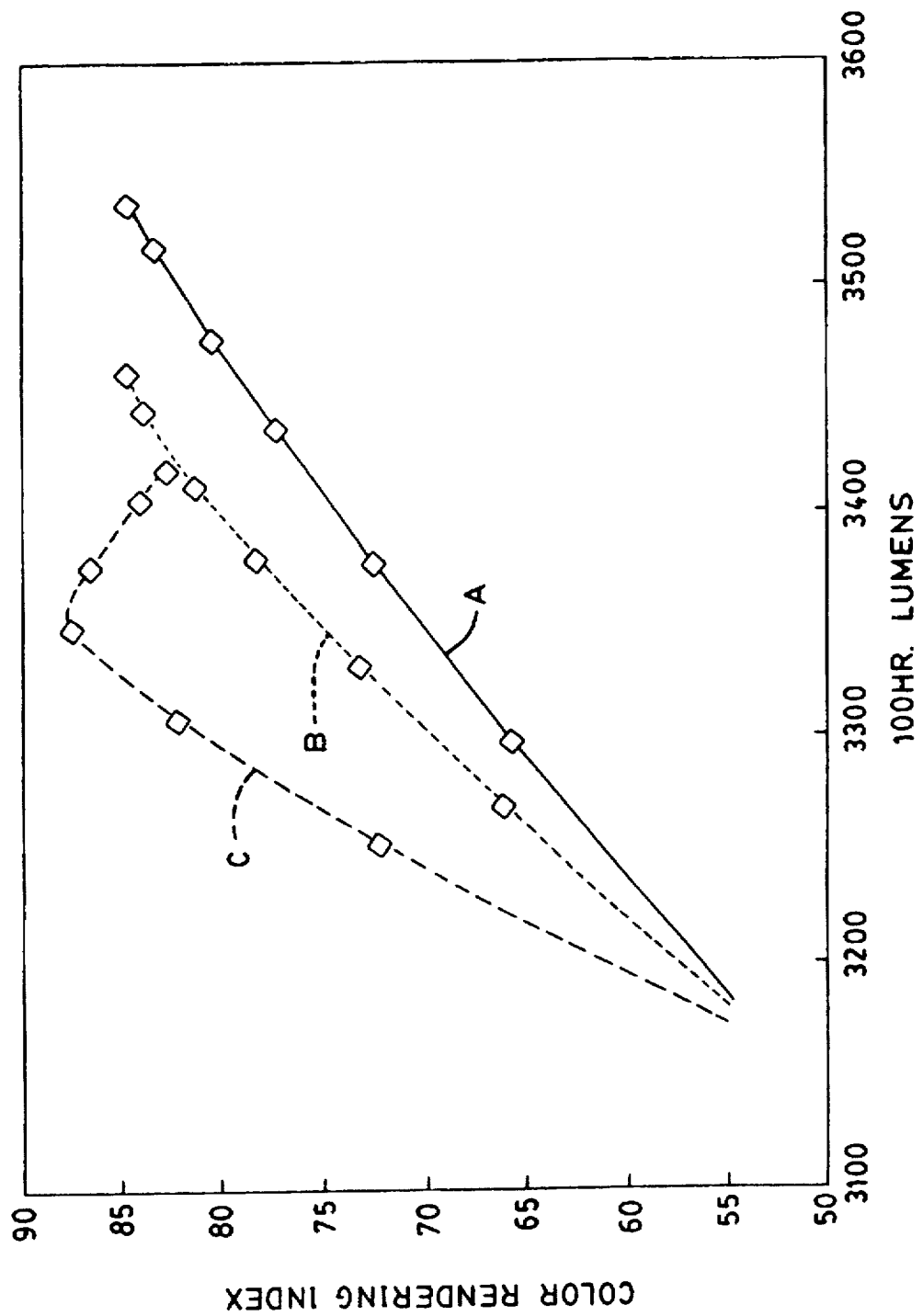
FIG. 4, for comparison purposes, shows curves demonstrating the performance capabilities of tri-phosphor blends (not of the present invention) in a particular lamp type and color point.

Three curves are shown in FIG. 4 demonstrating the performance capabilities of tri-phosphor blends applied as a second coat in 3000 K. 40 Watt Designer™ 800 Lamps. The color point is x=0.440 and y=0.405. The three curves show the expected brightness and CRI behavior of two-coat lamps as the second coat weight varies.

The lowest, solid curve, curve A, represents tri-phosphor blends where the green component consists of the Sylvania™ Type 2211 phosphor, $LaPO_4:Ce,Tb$, known as Type 2211, $LaPO_4:Ce,Tb$ (LAP). The characteristic of blends with this phosphor is high brightness and inferior CRI.

The next curve, curve B, represents tri-phosphor blends where the green component consists of the Sylvania™ Type 2297 phosphor, $CeMgAl_{11}O_{19}:Tb$, known as CAT.

The final curve, curve C, represents tri-phosphor blends where the green component consists of the Sylvania™ Type 2288 phosphor, $Zn_2SiO_4:Mn$ with bi-layer CVD coating as taught by Sigai and Klinedinst in U.S. Pat. Nos. 5,051,277 and 5,087,523. Tri-phosphor blends with this green component show an unusual maximum in CRI, at a high level. The other features of triblends that utilize the 2288 green is inferior brightness, but reduced cost since the 2288 green phosphor is not rare earth activated.

Note that all the curves converge at the bottom left of the graph to the limit of zero second coat weight, where the lamp preference will be that of the underlying base coat "Warm White" phosphor, Sylvania™ Type 4300. The top-right terminations of the curves are to be viewed as the ultimate performance of the single layer tri-phosphor blend lamps, where the contribution of the base coat falls to zero. Lamps made with three-component blends, utilizing either of these green components, in the economical preferred two-layer configuration, can only fall on one of these performance lines.

Figure 5:
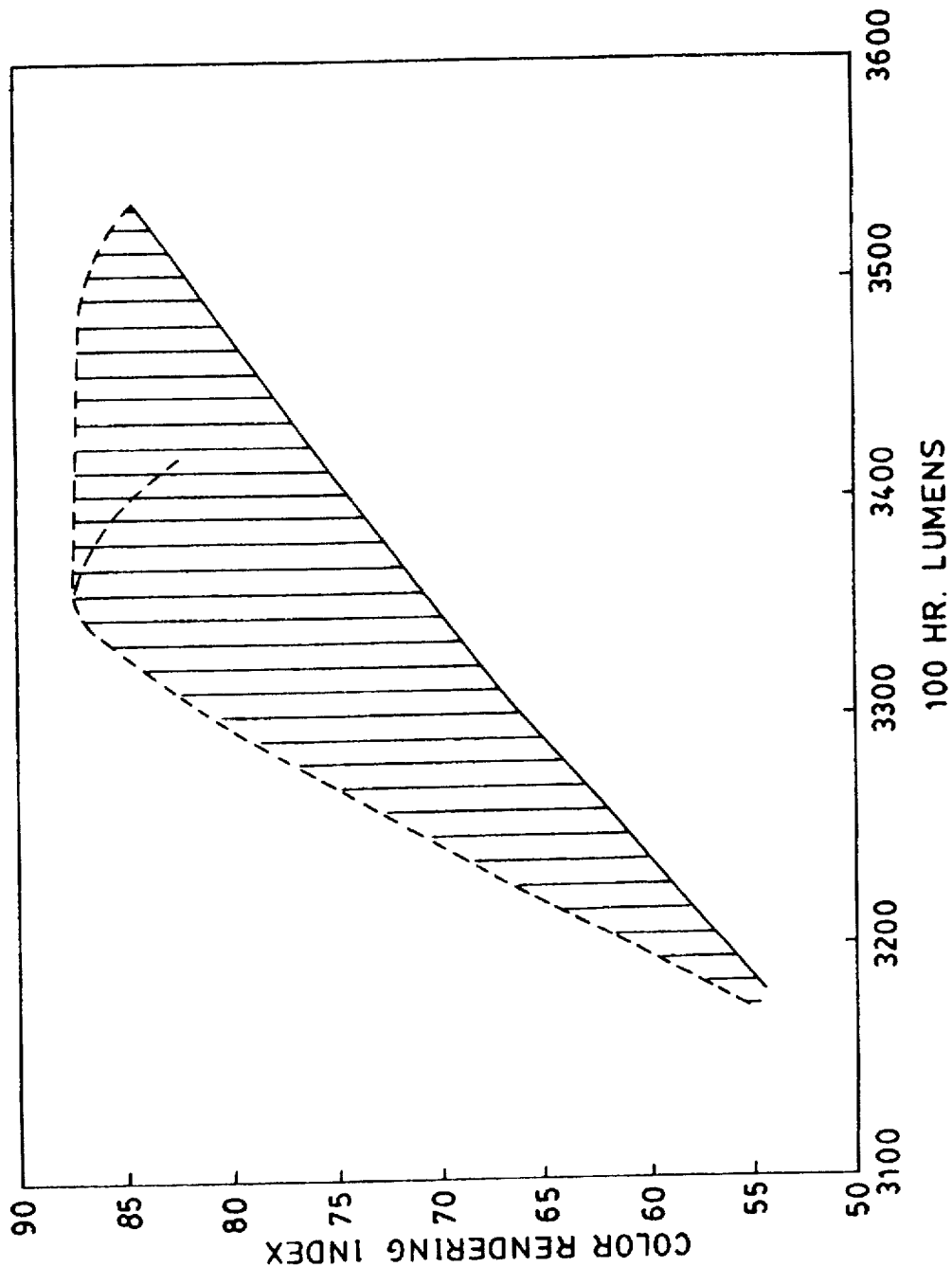
FIG. 5 graphically illustrates the continuous range of performance that can be achieved with quad-phosphor blends of the present invention.

FIG. 5 shows the continuous range of performance that can be achieved from quad-phosphor blends utilizing the two green phosphors, including Sylvania™ Type 2288 LAP in continuously variable proportions, in the double layer configuration. The range is bounded on the bottom right by boundary of the performance capability region is unusual in that the synergism of the two greens allows a boundary of high and constant CRI in a brightness range, 3350–3500 Lumens, where the CRI of the quad-phosphor blend exceed that of either tri-phosphor blend.

Figure 6:
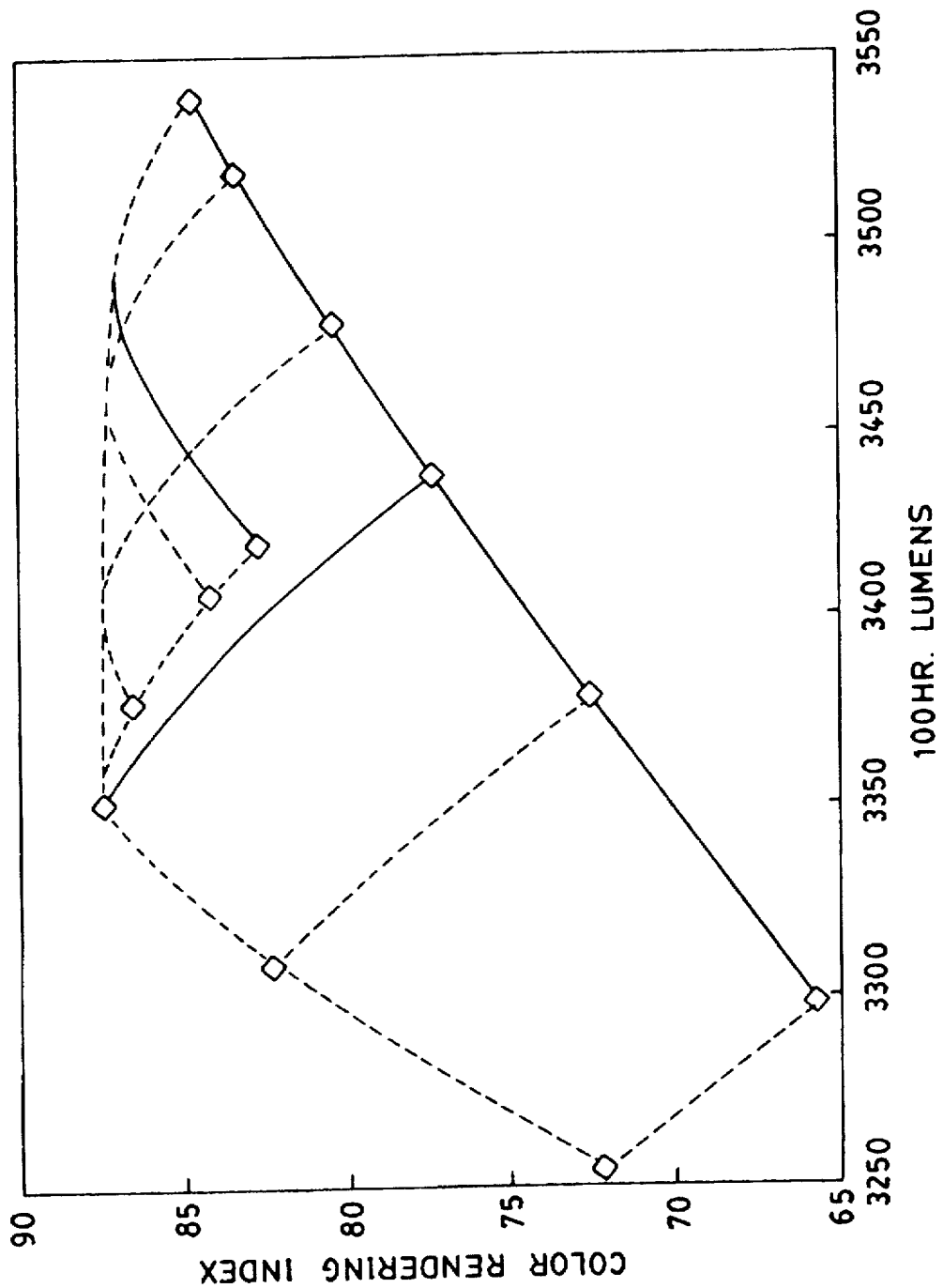
FIG. 6 shows a magnified section of the performance gamut illustrated in FIG. 5.

FIG. 6 shows a magnified section of the performance gamut demonstrated in FIG. 5 Included in FIG. 6 are curves of constant second coat weight. Note the curves join the end points of the quad-phosphor blends at the corresponding triblends. The curves are fairly straight at the lower left sections of quad-phosphor blend gamut, but become surprisingly convoluted in the high CRI/high brightness regime. It should be reiterated that the cost of premium, high brightness, high CRI lamps such as the Sylvania designer series is dominated by the cost of the rare-earth activated phosphors that comprise the tri-phosphor blend.

For example of the utility of such quad-phosphor blends, consider the situation where a lamp is desired that will provide 3325 lumens at a CRI of 80. A lamp that utilizes a 2288 green containing blend (left boundary) cannot meet the brightness target. A lamp made with a LAP tri-phosphor blend can meet the CRI objective at 2 grams, and with significant lumen excess. The performance requirement can be met exactly with a quad-phosphor blend at the economically preferred one gram second coat weight.

For another example, consider a very high performance lamp with 3450 lumens at a CRI at 85. Referring to FIG. 1, this level could be almost reached with a CAT tri-phosphor blend with 3 to 4 grams in the second coat, an extremely expensive proposition. Two different quad-phosphor blends could effect this performance, as shown in FIG. 3. The one of choice is on the two gram curve.

The above graphically demonstrates the complex cost/ CRI/brightness flexibility offered by four-component blends. The above focus is on the Sylvania™ F40/T12 3000° K. Designer Series. Those familiar with high performance fluorescent lamps will recognize that the flexibility of the quad-phosphor blend will carry over in similar fashion to other popular lamp colors, i.e. 3500 K. and 4100 K., as well as other lamp types such as T8.

We claim:

1. A fluorescent lamp comprising a glass envelope having electrodes at its ends, a mercury and inert gas filling within said envelope which produces ultraviolet radiation, a coating comprising at least one layer of a quad-phosphor blend for producing a converting a substantial portion of said ultraviolet radiation to visible illumination, said blend comprising a first and second green emitting phosphor components, each green emitting phosphor component having different visible emission spectrum principally in the 520 to 560 nm wavelength range, a third blue emitting phosphor component having an emission spectrum principally in the 440 to 470 nm wavelength range, and a fourth red emitting phosphor component having an emission spectrum principally in the 590 to 620 nm wavelength range, said first green emitting phosphor being an alkaline earth metal activated phosphor and said second green emitting phosphor being a rare earth activated phosphor wherein the relative proportions of the phosphor components are such that an enhanced color rendering index is produced as compared to tri-component blends formed from a three phosphor component blend consisting of single green component selected from said first and second green emitting phosphor components, and said third and fourth components.

2. A fluorescent lamp according to claim 1 wherein said phosphor coating blend is adapted to convert a substantial portion of said ultraviolet radiation to visible illumination having a white color.

3. A fluorescent lamp according to claim 2 wherein said phosphor blend is on the interior surface of the glass envelope for converts the emitted ultraviolet radiation to visible illumination having a white color.

4. A fluorescent lamp according to claim 3 wherein said phosphor coating comprises a dual layer comprises a first layer deposited on the inner glass surface and a second phosphor layer deposited on said first phosphor layer 33.

5. A fluorescent lamp according to claim 4 wherein said first layer comprises a halophosphor.

6. A fluorescent lamp according to claim 6 wherein second layer comprises a four component blend of phosphors of sufficient thickness for converting a substantial portion of the ultraviolet radiation to visible illumination having a white color.

7. A fluorescent lamp according to claim 6 wherein said first layer comprises a finely divided fluorescent calcium haloapatite phosphor exhibiting the desired white color point.

8. A fluorescent lamp according to claim 4 wherein said visible light has predetermined x and y values of ICI coordinates wherein the x value is in the range of 0.3 to 0.45, and said y value is in the range of 0.3 to 0.45.

9. A fluorescent lamp according to claim 8 wherein the amount of said quad-phosphor blend is from about 10 percent and 50 weight percent of the total combined phosphor weight of said first and said second phosphor layers.

10. A fluorescent lamp according to claim 4 wherein said alkaline earth metal activated green emitting phosphor is a zinc orthosilicate phosphor.

11. A fluorescent lamp according to claim 10 wherein said zinc orthosilicate phosphor has a continuous aluminum oxide coating surrounding individual phosphor particle.

12. A fluorescent lamp according to claim 11 wherein said zinc orthosilicate phosphor has a bi-layer coating consisting of a thin coating of silica applied between the base phosphor and a conformal alumina coating which is exposed to the mercury discharge.

13. A fluorescent lamp according to claim 12 wherein said second green emitting phosphor is less economical than the first green emitting phosphor.

14. A fluorescent lamp according to claim 12 wherein said second green emitting rare earth activated phosphors is selected from the group consisting of Tb—Ce activated magnesium aluminate, Tb—Ce activated yttrium silicate, and Tb—Ce activated lanthanum orthophosphate.

15. A fluorescent lamp according to claim 14 wherein said second green phosphor is a Tb—Ce activated lanthanum orthophosphate having a formula $LaPO_4:Ce,Tb$.

16. A fluorescent lamp according to claim 15 wherein said blue emitting phosphor is narrow band emitting phosphor.

17. A fluorescent lamp according to claim 16 wherein said blue emitting phosphors are selected from the group consisting of europium activated barium magnesium aluminate, europium activated strontium cholorophosphate, and europium activated strontium barium calcium chlorophosphate.

18. A fluorescent lamp according to claim 17 wherein said emitting phosphor has a formula $BaMg_2Al_{16}O_{27}:Eu^{+2}$.

19. A fluorescent lamp according to claim 17 wherein said fourth phosphor component is a red emitting phosphor activated by trivalent europium.

20. A fluorescent lamp according to claim 18 wherein said red emitting phosphor is europium activated gadolinium oxide ($Gd_2O_3:Eu^{+3}$) or europium activated yttrium oxide ($Y_2O_3:Eu^{+3}$) or mixtures thereof.

21. A fluorescent lamp according to claim 20 wherein said yttrium oxide activated by trivalent europium having a peak emission at 611 nm.

22. A fluorescent lamp according to claim 21 wherein said quad phosphor blend has a brightness is greater than 80 LPW and a CRI greater than about 80.

23. A fluorescent lamp according to claim 22 wherein said alkaline earth metal activated green phosphor comprises a hi-layered CVD coated zinc orthosilicate phosphor, said rare earth activated green phosphor comprises a Tb—Ce activated lanthanum orthophosphate, and said third phosphor component comprises a blue emitting barium magnesium aluminate activated by divalent curopium, and said fourth phosphor component comprises a red emitting phosphor trivalent europium activated yttrium oxide.

24. A fluorescent lamp according to claim 23 wherein said quad phosphor blend is defined as the region of white light having a predetermined color point where the x value is in the range of about 0.3 to about 0.45 and the y value is within about 0.25 of the Planckian locus.

25. A fluorescent lamp according to claim 23 wherein said quad phosphor blend of phosphors based on weight percent comprise about 1 to about 35 weight percent of the alkaline metal activated green emitting phosphor, about 1 to about 50 percent of the rare earth activated green emitting phosphor, about 1 to about 30 percent of the blue emitting phosphor, and about 30 to about 70 weight percent of the red emitting phosphor.

26. A fluorescent lamp according to claim 21 wherein said quad phosphor blend has color coordinates x and y on a standard CIE colorimetric x-y chromaticity diagram having values within a triangular area on said chromaticity diagram, said triangular area being defined by a quad blend which is substantially the red phosphor component, a quad blend which is substantially the blue phosphor component, and a quad blend which is substantially one of the green phosphor components.

27. A fluorescent lamp according to claim 23 wherein said quad phosphor blend has color coordinates x and y on a standard CIE colorimetric x-y chromaticity diagram having values within a triangular area on said chromaticity diagram, said triangular area being defined by a quad blend which is substantially the red phosphor component, a quad blend which is substantially the blue phosphor component, and a quad blend which is substantially one of the green phosphor components.

* * * * *